United States Patent
Oshima et al.

(10) Patent No.: US 9,902,341 B2
(45) Date of Patent: Feb. 27, 2018

(54) IMAGE PROCESSING APPARATUS AND IMAGE PROCESSING METHOD INCLUDING AREA SETTING AND PERSPECTIVE CONVERSION

(71) Applicant: KYOCERA Corporation, Kyoto (JP)

(72) Inventors: Takeo Oshima, Ichikawa (JP); Takatoshi Nakata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/119,319

(22) PCT Filed: Feb. 26, 2015

(86) PCT No.: PCT/JP2015/001015
§ 371 (c)(1),
(2) Date: Aug. 16, 2016

(87) PCT Pub. No.: WO2015/129280
PCT Pub. Date: Sep. 3, 2015

(65) Prior Publication Data
US 2017/0011539 A1    Jan. 12, 2017

(30) Foreign Application Priority Data

Feb. 26, 2014  (JP) .................................. 2014-036067

(51) Int. Cl.
*B60R 11/04* (2006.01)
*G03B 37/04* (2006.01)
(Continued)

(52) U.S. Cl.
CPC .............. *B60R 11/04* (2013.01); *G03B 37/04* (2013.01); *G06K 9/00791* (2013.01);
(Continued)

(58) Field of Classification Search
None
See application file for complete search history.

(56) References Cited

U.S. PATENT DOCUMENTS 7,307,655 B1   12/2007  Okamoto et al.
2009/0097708 A1 *  4/2009  Mizuta ................... G06T 11/00
                                                      382/103
(Continued)

FOREIGN PATENT DOCUMENTS

JP       2002-135765 A    5/2002
JP       2007-195061 A    8/2007
(Continued)

OTHER PUBLICATIONS

International Search Report issued in PCT/JP2015/001015; dated Apr. 7, 2015.
(Continued)

*Primary Examiner* — Justin P. Misleh
(74) *Attorney, Agent, or Firm* — Studebaker & Brackett PC (57) ABSTRACT

An image processing apparatus and method can combine images, while maintaining continuity without causing discomfort, that capture the surrounding area of an automobile. An image processing apparatus includes an image acquisition unit that acquires first and second images respectively capturing surrounding areas of an automobile including first and second areas, an outline detector that performs outline detection on the first and second images and generates first and second outlines respectively, a determiner that determines whether the first and second outlines each include an outline of the same object, and a area selector that performs area setting and perspective conversion on the first or second image when the first and second outlines are determined to include an outline of the same object, so that in a combined image generated by combining at least the first and second images, the first and second outlines are continuous at the same object.

9 Claims, 8 Drawing Sheets

(51) Int. Cl.
*H04N 5/232* (2006.01)
*G06K 9/00* (2006.01)
*G06K 9/20* (2006.01)
*H04N 7/18* (2006.01)
*G06T 3/40* (2006.01)
*H04N 5/247* (2006.01)

(52) U.S. Cl.
CPC .... *H04N 5/23238* (2013.01); *B60R 2300/303* (2013.01); *G06K 2009/2045* (2013.01); *G06T 3/4038* (2013.01); *H04N 5/247* (2013.01); *H04N 7/181* (2013.01)

(56) References Cited

U.S. PATENT DOCUMENTS

| | | | | |
|---|---|---|---|---|
| 2010/0220190 | A1* | 9/2010 | Hiroshi | B60R 1/00 348/148 |
| 2012/0121136 | A1* | 5/2012 | Gloger | B60R 1/00 382/104 |
| 2012/0170812 | A1* | 7/2012 | Kamiyama | B60R 1/00 382/103 |
| 2012/0219190 | A1* | 8/2012 | Kumagai | G06T 7/55 382/104 |
| 2014/0009614 | A1* | 1/2014 | Yoon | G06K 9/00791 348/148 |
| 2016/0217625 | A1* | 7/2016 | Oba | G06T 3/4038 |

FOREIGN PATENT DOCUMENTS

| | | |
|---|---|---|
| JP | 2007-274564 A | 10/2007 |
| JP | 2010-166196 A | 7/2010 |
| JP | 2013-129278 A | 7/2013 |

OTHER PUBLICATIONS

Written Opinion issued in PCT/JP2015/001015; dated Apr. 7, 2015; with English language Concise Explanation.

An Office Action; "Notice of Reasons for Rejection" issued by the Japanese Patent Office dated Jul. 25, 2017, which corresponds to Japanese Patent Application No. 2016-505078 and is related to U.S. Appl. No. 15/119,319; with English language Concise Explanation.

* cited by examiner

IMAGE PROCESSING APPARATUS AND IMAGE PROCESSING METHOD INCLUDING AREA SETTING AND PERSPECTIVE CONVERSION

CROSS-REFERENCE TO RELATED APPLICATION

This application claims priority to and the benefit of Japanese Patent Application No. 2014-036067 filed Feb. 26, 2014 and PCT Application No. PCT/JP2015/001015, the entire contents of which are incorporated herein by reference.

TECHNICAL FIELD

This disclosure relates to an image processing apparatus and image processing method that accurately combine a plurality of images that capture the surrounding area of a vehicle, without causing any sense of discomfort.

BACKGROUND

Systems for assisting with the driving of a vehicle, such as an automobile, have been proposed. For example, one known system generates a 360° overhead image by capturing the vehicle periphery with a plurality of on-board cameras and combining the images (overhead image generation system). The overhead image generation system for example assists with driving when parking by showing the driver the combined image.

The on-board cameras used in such a system are mounted by adjusting the position and orientation when installing the cameras on the automobile, so that no discontinuity occurs at the seams between images. For reasons such as vibration of the automobile or an external shock, however, the position and orientation of attachment might end up shifting. In such a case, continuity is lost at the image seams in the combined image.

JP 2010-166196 A (PTL 1) discloses an overhead image generation system in which distant 360° circular images are combined to suppress the occurrence of overlap at the seams between images of the cameras.

CITATION LIST

Patent Literature

PTL 1: JP 2010-166196 A

SUMMARY

Technical Problem

By including distant 360° circular images, however, the method disclosed in PTL 1 reduces the area that becomes the seam in a nearby front image, right image, back image, and left image. In other words, PTL 1 prevents a discontinuous portion at the seams in near images from being conspicuous but does not correct the discontinuous portion. Accordingly, even if the method in PTL 1 is used, the driver may feel a sense of discomfort at the seams of the combined image.

Therefore, it would be helpful to provide an image processing apparatus and image processing method that can combine a plurality of images, while maintaining continuity without causing any sense of discomfort, that capture the surrounding area of a vehicle.

Solution to Problem

In order to resolve the aforementioned problem, an image processing apparatus of this disclosure includes:

an image acquisition unit configured to acquire a first image capturing a surrounding area of an automobile including a first area and a second image capturing a surrounding area of the automobile including a second area adjacent to the first area;

an outline detector configured to perform outline detection on the first image and the second image and to generate a first outline and a second outline respectively;

a determiner configured to determine whether the first outline and the second outline each include an outline of a same object; and a area selector configured to perform area setting and perspective conversion on the first image or the second image when the determiner determines that the first outline and the second outline include an outline of the object, so that in a combined image generated by combining at least the first image and the second image, the first outline and the second outline are continuous at the object.

In order to resolve the aforementioned problem, an image processing apparatus of this disclosure includes:

an image acquisition unit configured to acquire a first image capturing a surrounding area of an automobile including a first area and a second image capturing a surrounding area of the automobile including a second area adjacent to the first area; and a area selector configured to perform area setting and perspective conversion on the first image or the second image when a same object appears in each of the first image and the second image due to movement of the automobile, so that a position and an orientation of the object in one of the first image and the second image match a position and an orientation sought by calculation based on a position and an orientation of the object in the other one of the first image and the second image.

In order to resolve the aforementioned problem, an image processing method of this disclosure includes:

acquiring a first image capturing a surrounding area of an automobile including a first area and a second image capturing a surrounding area of the automobile including a second area adjacent to the first area;

performing outline detection on the first image and the second image and generating a first outline and a second outline respectively;

determining whether the first outline and the second outline each include an outline of a same object; and performing area setting and perspective conversion on the first image or the second image when the first outline and the second outline are determined to include an outline of the object, so that in a combined image generated by combining at least the first image and the second image, the first outline and the second outline are continuous at the object.

In order to resolve the aforementioned problem, an image processing method of this disclosure includes:

acquiring a first image capturing a surrounding area of an automobile including a first area and a second image capturing a surrounding area of the automobile including a second area adjacent to the first area; and performing area setting and perspective conversion on the first image or the second image when a same object appears in each of the first image and the second image due to movement of the automobile, so that a position and an orientation of the object in one of the first image and the second image match a position and an orientation sought by calculation based on a position and an orientation of the object in the other one of the first image and the second image.

Advantageous Effect

An image processing apparatus and image processing method according to this disclosure can combine a plurality of images, while maintaining continuity without causing any sense of discomfort, that capture the surrounding area of a vehicle.

BRIEF DESCRIPTION OF THE DRAWINGS

In the accompanying drawings.

DETAILED DESCRIPTION

Embodiment 1

Figure 1:
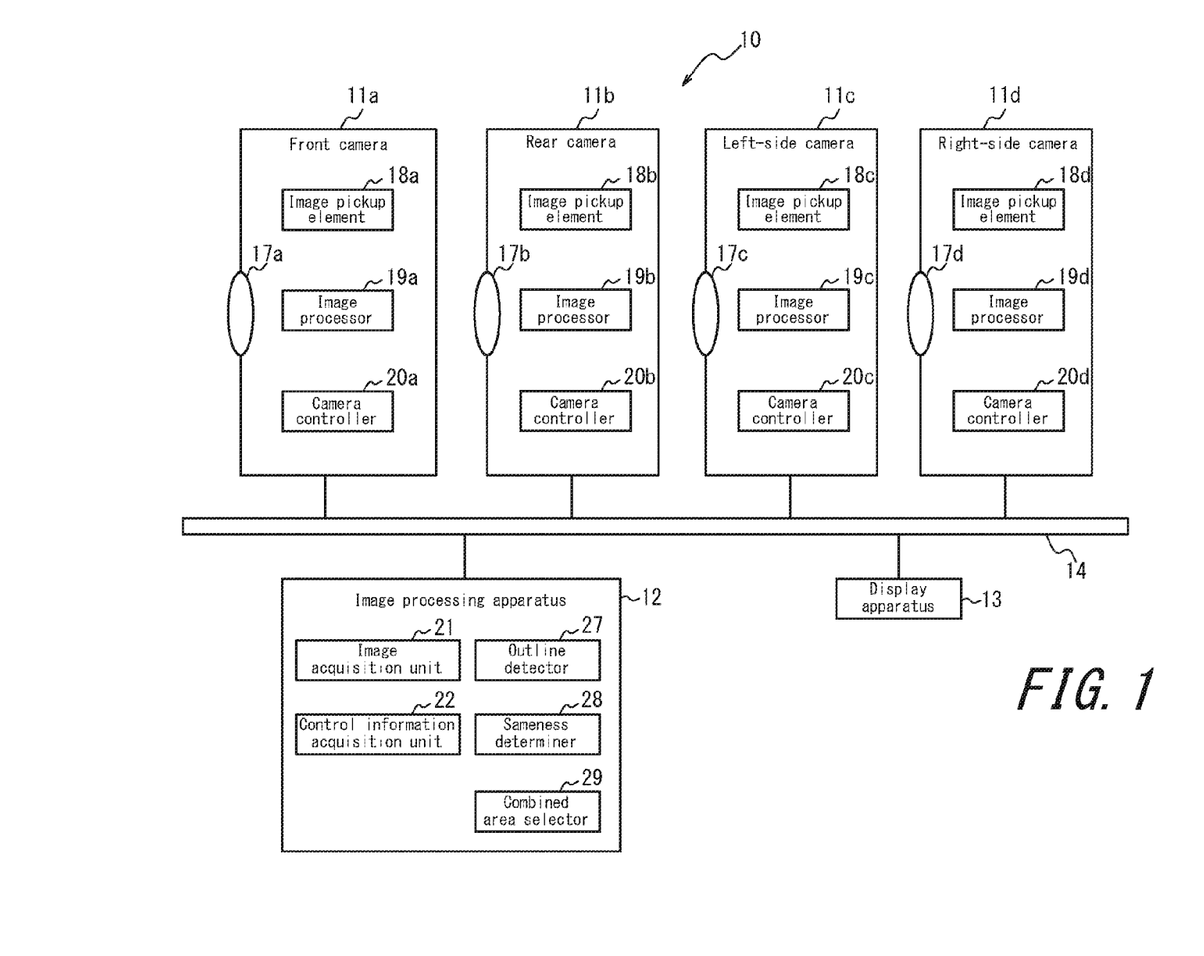
FIG. 1 is a block diagram schematically illustrating the structure of an image processing apparatus according to an embodiment and a camera system provided with the image processing apparatus.
Figure 2:
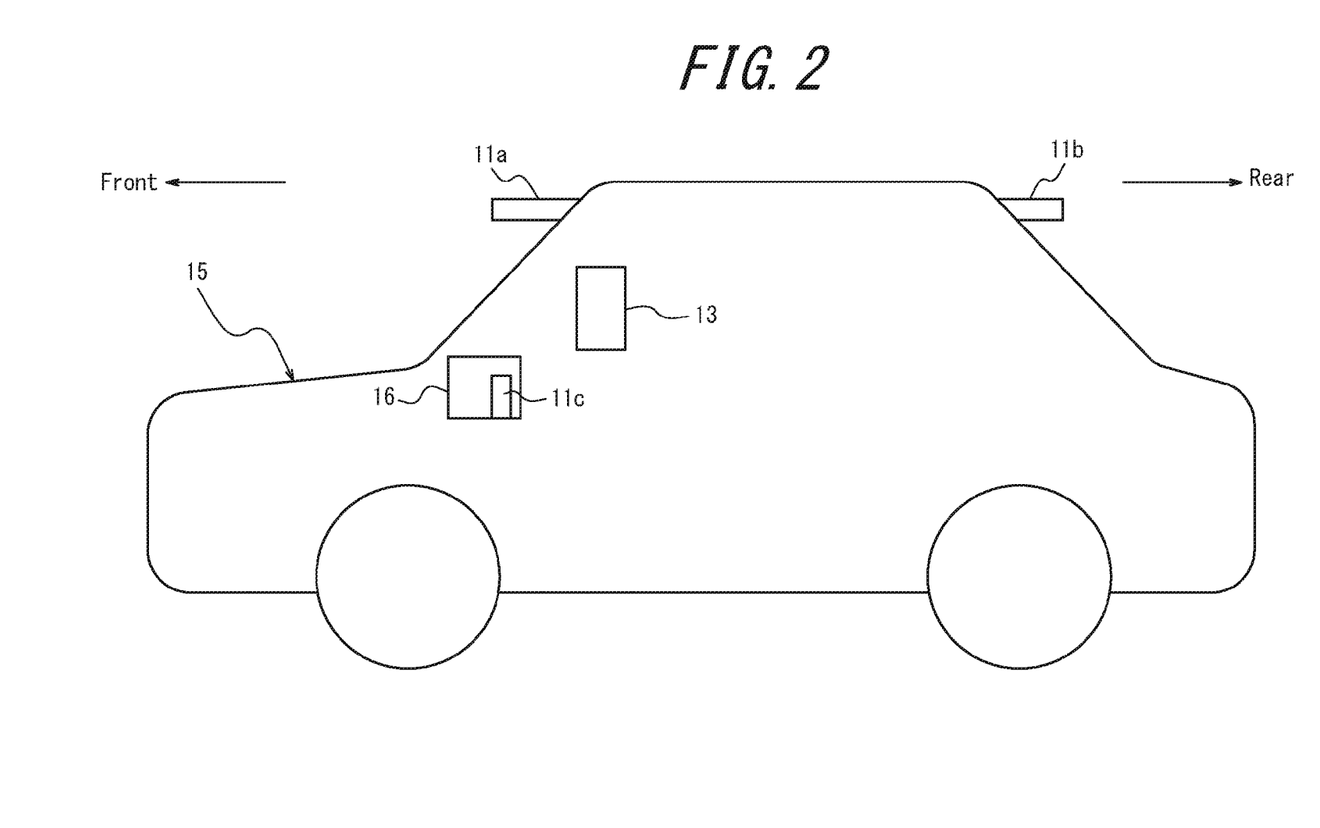
FIG. 2 schematically illustrates the arrangement of constituent elements of the camera system in FIG. 1.

The following describes Embodiment 1 with reference to the drawings.
First, an image processing apparatus 12 and a camera system 10 according to Embodiment 1 are described. FIG. 1 is a functional block diagram schematically illustrating the structure of the camera system 10, which is provided with the image processing apparatus 12.
As illustrated in FIG. 1, the camera system 10 is provided with a plurality of image pickup apparatuses (front camera 11a, rear camera 11b, left-side camera 11c, and right-side camera 11d), the image processing apparatus 12, and a display apparatus 13. In this embodiment, each of the constituent elements of the camera system 10 can transmit and receive information via a network 14 such as a dedicated line or a Controller Area Network (CAN). In the camera system 10, the image processing apparatus 12 may be provided with a display having the same functions as the display apparatus 13.
As illustrated in FIG. 2, the front camera 11a is positioned so as to be able to capture the surrounding area at the front of a vehicle 15, such as an automobile. The rear camera 11b is positioned so as to be able to capture the surrounding area at the back of the vehicle 15. The left-side camera 11c and the right-side camera 11d are for example positioned to face vertically downward at the left and right door mirrors 16 so as to be able to capture the surrounding area at the sides of the vehicle 15. In FIG. 2, the right-side camera 11d is hidden by the body of the vehicle 15 and therefore is not illustrated. The left-side camera 11c and the right-side camera 11d are symmetrically disposed respectively on the left and right sides of the vehicle 15. The display apparatus 13 is disposed at a position visible from the driver's seat.

The front camera 11a, rear camera 11b, left-side camera 11c, and right-side camera 11d are provided with a lens having a wide-angle view, such as a fisheye lens, and can take wide-angle shots of the surrounding area of the vehicle 15. Typically, objects can be photographed over a wide range with wide-angle photography, and objects in the image periphery are curved. The curvature, however, is corrected by the image pickup apparatus itself or by the image processing apparatus 12 and then displayed on the display apparatus 13. The captured images from the front camera 11a, rear camera 11b, left-side camera 11c, and right-side camera 11d in this embodiment respectively correspond to the front area Ai, rear area Bi, left-side area Ci, and right-side area Di of the vehicle 15 as illustrated in FIGS. 3, 4, 6, and 8.

Next, referring again to FIG. 1, the structure of the front camera 11a, rear camera 11b, left-side camera 11c, and right-side camera 11d is described. The front camera 11a is provided with an optical system 17a, an image pickup element 18a, an image processor 19a, and camera controller 20a.

The optical system 17a is configured to include a diaphragm and a lens and forms an image of an object. In this embodiment, the optical system 17a has a wide-angle view, and as described above, can capture objects included in the surrounding area of the vehicle 15.

The image pickup element 18a may, for example, be a CMOS image pickup element and picks up the object image formed by the optical system 17a. The image pickup element 18a also outputs the captured image generated by image pickup to the image processor 19a as an image signal.

The image processor 19a may, for example, be a dedicated processor for image processing, such as a DSP. The image processor 19a applies predetermined image processing to the image signal acquired from the image pickup element 18a, such as noise removal, color interpolation, brightness correction, color correction, gamma correction, and white balance. The image processor 19a outputs the image signal to which regular image processing has been applied to the image processing apparatus 12.

The camera controller 20a may, for example, be a dedicated microprocessor or a general purpose CPU that executes specific functions by reading a specific program. The camera controller 20a controls operations of each portion of the front camera 11a. For example, the camera controller 20a controls operations of the image pickup element 18a and the image processor 19a and periodically outputs an image signal, for example every 30 fps.

Like the front camera 11a, the rear camera 11b, left-side camera 11c, and right-side camera 11d are respectively provided with optical systems 17b, 17c, and 17d, image pickup elements 18b, 18c, and 18d, image processors 19b, 19c, and 19d, and camera controllers 20b, 20c, and 20d. The functions and structure of the optical systems 17b, 17c, and 17d, image pickup elements 18b, 18c, and 18d, image processors 19b, 19c, and 19d, and camera controllers 20b, 20c, and 20d are similar to those of the front camera 11a.

The image processing apparatus 12 is provided with an image acquisition unit 21, a control information acquisition unit 22, an outline detector 27, a sameness determiner 28, and a combined area selector 29. Each of the functional units of the image processing apparatus 12 may, for example, be implemented with a dedicated microprocessor or a general purpose CPU that executes specific functions by reading a specific program.

Via the network 14, the image acquisition unit 21 acquires the captured images of the surrounding area in each corresponding direction from the front camera 11a, rear camera 11b, left-side camera 11c, and right-side camera 11d. The image acquisition unit 21 may acquire all or only a portion of the captured images of the surrounding areas to the front, rear, and sides (right and left). As described below, in the image processing apparatus 12 of this embodiment, processing such as rotation or reduction might be performed on the captured images of the surrounding areas, and the image acquisition unit 21 therefore preferably acquires captured images at a larger pixel size than captured images for a regular combined image.

The control information acquisition unit 22 acquires control information on the vehicle 15. The control information is a variety of information related to the state of the vehicle 15, for example information indicating forward or backward movement, steering angle, and speed of the vehicle 15. The control information acquisition unit 22 can acquire the control information by any method, such as acquisition of the control information from the vehicle 15 over the network 14 or acquisition, over a wired or wireless connection, of control information output by another constituent element provided in the vehicle 15.

As described below, the combined area selector 29 generates a combined image using a plurality of captured images acquired by the image acquisition unit 21. In this embodiment, the combined image is a 360° overhead image of the vehicle 15. An overhead image refers to an image of the surrounding area of the vehicle 15 when viewing the vehicle 15 vertically downward from above.

First, the combined area selector 29 cuts out a predetermined range corresponding to the size of the combined image from each captured image used to generate the combined image. The combined area selector 29 applies processing for perspective conversion to the plurality of captured images that were cut out to convert the images to overhead images.

Next, the combined area selector 29 generates a combined image using the plurality of captured images to which processing for perspective conversion was applied. Furthermore, to generate the combined image, the combined area selector 29 also uses an image of the vehicle 15 viewed vertically downward from above. For example, in the combined image illustrated in FIG. 3, an image indicating the vehicle 15 is used in a partial area (vehicle display area) Ei at the center of the combined image. The image of the front camera 11a is used in the front area Ai in front of the area Ei. The image of the rear camera 11b is used in the rear area Bi behind the area Ei. The image of the left-side camera 11c is used in the left-side area Ci to the left of the area Ei. The image of the right-side camera 11d is used in the right-side area Di to the right of the area Ei.

Figure 3:
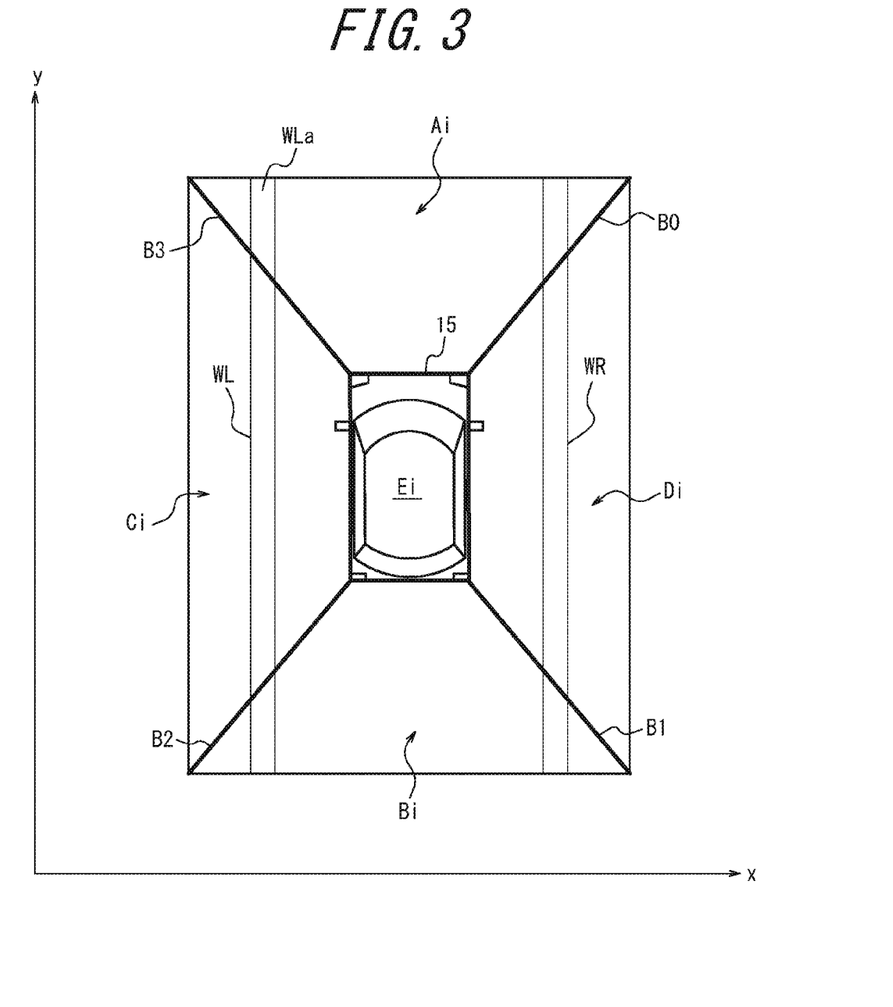
FIG. 3 illustrates an example of a combined image generated by the image processing apparatus of FIG. 1.
Figure 4:
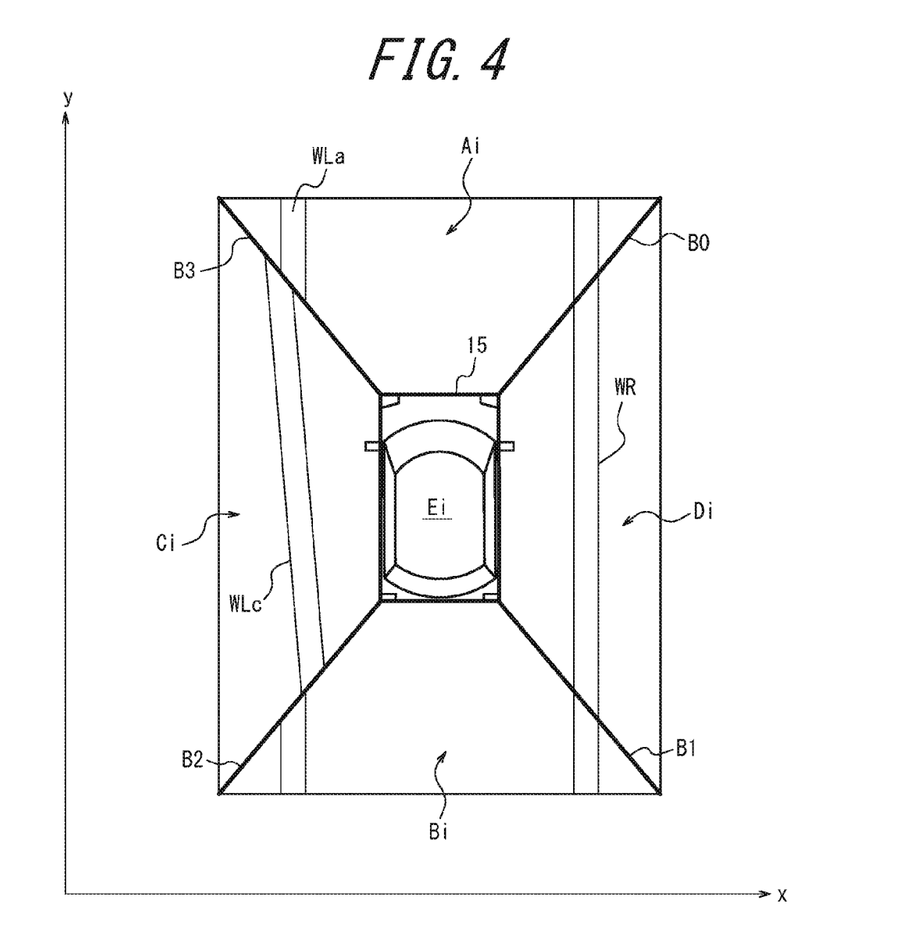
FIG. 4 illustrates an example of a combined image to be corrected.

FIG. 4 illustrates a white line WL (see FIG. 3) on the road surface in the combined image being discontinuous at the borders B2 and B3 as a result of a shift in the image pickup range due to the attachment position of the left-side camera 11c being shifted by, for example, an external shock. If the generated combined image for example has a discontinuity as in FIG. 4, then in accordance with information from the outline detector 27 or the like, the combined area selector 29 executes processing for setting the area and for perspective conversion of a specific captured image and generates a new combined image that has continuity. Details on the area setting and the perspective conversion are provided below, but in short, area setting refers to setting the ratio of expansion/reduction and the shift amount.

The outline detector 27 extracts the outline of two adjacent captured images. The outline detector 27 may use a known method to extract the outline, such as a method to calculate the difference between adjacent pixels, a method that uses a Sobel filter, or a method that uses a Laplacian filter. The images of outlines (outline images) extracted by the outline detector 27 in correspondence with two adjacent captured images are output to the sameness determiner 28 and the combined area selector 29 and are used to determine the continuity of the outline images, and for area setting and perspective conversion of the captured images. While details are provided below, it suffices for the outline detector 27 to extract the outline of an object extending across the border between two adjacent captured images when the captured images are combined or to extract the outline of an object existing near the border. In other words, the outline detector 27 does not need to extract the outline of all of the objects in two adjacent captured images.

Based on the outline images of two adjacent captured images, the sameness determiner 28 determines whether objects appearing in the two captured images include the same object. Examples of the same object appearing in two captured images include a display on the road surface (a white line of a side strip or center line, or a display of a speed limit or an indication to stop), a guardrail, a side ditch, a road shoulder (sidewalk), or the like. The vehicle 15 may be moving or may be stopped. The sameness determiner 28 may use a Hough transform to detect the same object correctly. By using a Hough transform, an object can be detected correctly even if the outline of the object is discontinuous in the outline image.

When the sameness determiner 28 determines that the objects are the same, the result of determination is communicated to the combined area selector 29. So that the outlines of the same object in the two adjacent captured images are continuous in the combined image of the captured images, the combined area selector 29 performs area setting and perspective conversion setting of the captured images and can thus generate a combined image with no discontinuity.

The display apparatus 13 may, for example, be configured to include an LCD and can display a moving image in real time. The display apparatus 13 displays the combined image output by the image processing apparatus 12 over the network 14. The display apparatus 13 may, for example, be configured as a touch panel and may also function as an interface to accept user operation.

With reference to the drawings, an example of the combined image including a discontinuity is provided below, and processing by the image processing apparatus 12 is then described.

For comparison, with reference to FIG. 3, an example is first provided of an image displayed on the display apparatus 13 for the case of a plurality of images that capture the surrounding area of the vehicle 15 being combined accurately and without causing any sense of discomfort. The combined area selector 29 cuts out and combines the captured images of the front area Ai, rear area Bi, left-side area Ci, and right-side area Di of the vehicle 15 and displays, on the display apparatus 13, a combined image that is a 360° overhead image of the vehicle 15.

In the example in FIG. 3, the surface of the road on which the vehicle 15 is driven, a white line WL (such as a side strip) on the road surface, and a white line WR (such as a center line) are displayed on the display apparatus 13. The borders B0, B1, B2, and B3 respectively indicate the borders between captured images at the front area Ai and the right-side area Di, the right-side area Di and the rear area Bi, the rear area Bi and the left-side area Ci, and the left-side area Ci and the front area Ai. In the example in FIG. 3, the white line WL exhibits no discontinuity at the borders B2 and B3, and the white line WR also exhibits no discontinuity at the borders B0 and B1. In other words, since the white line WL and the white line WR neither differ in thickness nor have any discontinuity, the plurality of images capturing the area surrounding the vehicle 15 are combined accurately and without causing any sense of discomfort. The xy-axes in FIG. 3 are virtual coordinate axes for the combined image. In the example in FIG. 3, the vehicle 15 moves forward in the direction of the y-axis, and the white line WL and the white line WR extend in the direction of the y-axis.

On the other hand, as already described above, the example in FIG. 4 illustrates a discontinuity in the white line WL at the borders B2 and B3. Such a discontinuity may, for example, occur due to the position of attachment or the orientation of the image pickup apparatus shifting as a result of vibration of the vehicle 15 during driving, an external shock, or other such reason. With the processing described below, the image processing apparatus 12 in this embodiment detects and corrects the discontinuity occurring at the borders of a combined image such as the one illustrated in FIG. 4 and displays an accurate combined image having continuity, such as the image illustrated in FIG. 3, on the display apparatus 13.

Figure 5:
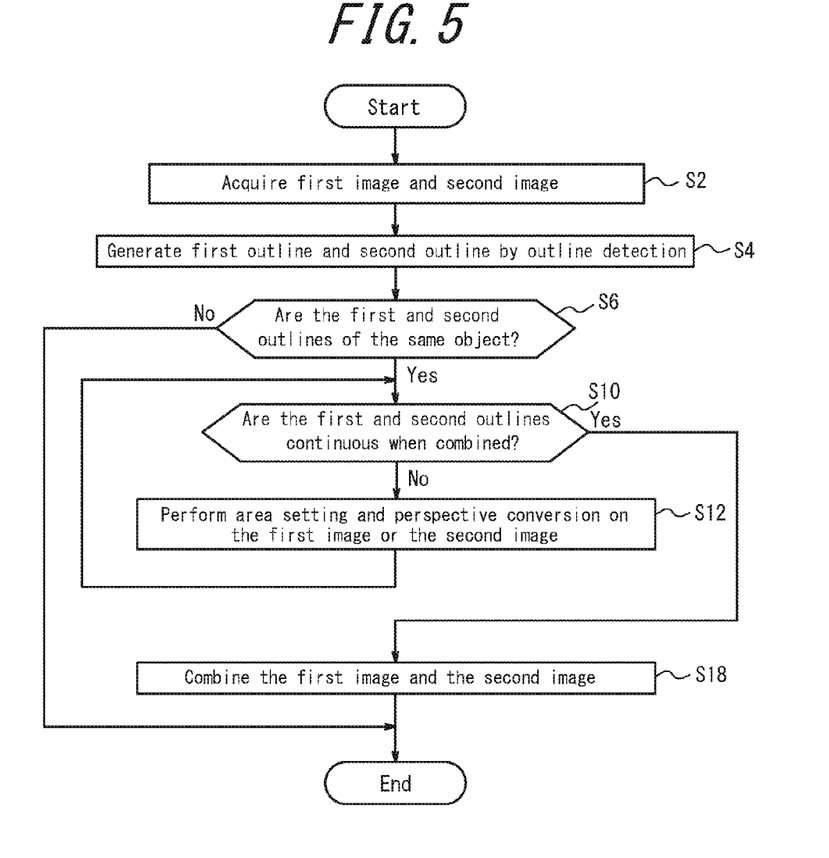
FIG. 5 is a flowchart illustrating operations by the image processing apparatus of Embodiment 1.

The flow of processing by the image processing apparatus 12 is described with reference to FIG. 5. Each step is described in detail using the example in FIG. 4. An outline of the processing is as follows. The image acquisition unit 21 acquires adjacent captured images and outputs the captured images to the outline detector 27 and the combined area selector 29. The outline detector 27 extracts outlines from the received adjacent captured images and outputs the extracted outlines to the sameness determiner 28 and the combined area selector 29. The sameness determiner 28 determines whether the outlines extracted at the border between adjacent captured images include the same object (for example, the white line of a side strip or center line) and outputs the determination result to the combined area selector 29. When receiving a result from the sameness determiner 28 indicating that the same object is included, the combined area selector 29 performs area setting and perspective conversion on one of the captured images and then generates a combined image, so that the outlines extracted at the border between adjacent captured images is not discontinuous. Details are provided below.

The image acquisition unit 21 of the image processing apparatus 12 acquires a first image and a second image (step S2). Among the captured images of the front area Ai, rear area Bi, left-side area Ci, and right-side area Di, the first image and the second image are two adjacent captured images. The image acquisition unit 21 for example outputs the captured image of the front area Ai as the first image and the captured image of the left-side area Ci as the second image to the outline detector 27 and the combined area selector 29. In this example, the front area Ai and the left-side area Ci respectively correspond to the first area and the second area of this disclosure. The processing described below is executed by the outline detector 27, the sameness determiner 28, and the combined area selector 29 on the captured image of the front area Ai and the captured image of the left-side area Ci. Subsequently, the image acquisition unit 21 for example outputs the captured image of the left-side area Ci as the first image and the captured image of the rear area Bi as the second image to the outline detector 27 and the like. In this way, the image acquisition unit 21 outputs a pair of adjacent captured images that capture the area surrounding the vehicle 15 to the outline detector 27 and the like while changing the combination of captured images.

The outline detector 27 of the image processing apparatus 12 performs outline detection on each image in the received pair of adjacent captured images (first image and second image) and generates a first outline and a second outline (step S4).

The outline detector 27 for example uses the aforementioned Laplacian filter or the like to perform the outline detection. The first outline and the second outline are outlines detected respectively for the first image and second image. In this embodiment, the first outline and the second outline do not include the outlines of all of the objects in the first image and the second image. The first outline and the second outline are used by the sameness determiner 28 and the combined area selector 29 so as to generate a combined image with no discontinuity at the border when the first image and the second image are combined. Therefore, it suffices for the first outline and the second outline to extract the outline of an object extending across the border when the first image and the second image are combined or to extract the outline of an object existing near the border.

For example, in FIG. 4, suppose that the captured image of the front area Ai is the first image, and the captured image of the left-side area Ci is the second image. In this case, the first outline includes the outline of a portion of the extracted white line WL (white line WLa) but does not include the outline of a portion of the white line WR. The reason is that the white line WR is distant from the border between the first image and the second image and cannot be considered to be near the border. The second outline includes the outline of a portion of the extracted white line WL (white line WLc). The outline detector 27 outputs an image including the first outline (first outline image) and an image including the second outline (second outline image) to the sameness determiner 28.

The sameness determiner 28 of the image processing apparatus 12 receives the first outline image and the second outline image. The sameness determiner 28 then determines whether the first outline and the second outline are of the same object (step S6). Step S6 corresponds to the step of determining sameness in this disclosure.

The sameness determiner 28 can determine that the first outline and the second outline are outlines of the same object by estimating that the first outline and the second outline are outlines of, for example, a display on the road surface, a guardrail, a side ditch, a road shoulder, or the like based, for example, on characteristics of the first outline and second outline. For example, a side strip, center line, or other display on the road surface, a guardrail, a side ditch, a road shoulder, or the like have the characteristics of being long and parallel to the road on which the vehicle 15 is being driven.

Whereas a white line on the road surface, such as a side strip, and a road shoulder are straight lines that extend over a long distance without interruption, a center line, side ditch, guardrail, or the like may be a broken line. At this point, by estimating a straight line using a Hough transform, the sameness determiner 28 can improve the accuracy of the determination that an object is a display on the road surface or the like. The sameness determiner 28 determines whether the first outline and the second outline are outlines of the same object, such as a display on the road surface, and outputs the determination result to the combined area selector 29. The first outline and the second outline to which the Hough transform has been applied are also output to the combined area selector 29. In the example in FIG. 4, the entire first outline and second outline are outlines of the same object (white line WL). The first outline and second outline do not, however, entirely need to be outlines of the same object and may be determined by the sameness determiner 28 to be outlines of the same object by virtue of simply including outlines of the same object.

When the sameness determiner 28 determines that the first outline and the second outline are of the same object (step S6: Yes), the combined area selector 29 of the image processing apparatus 12 determines whether the first outline and the second outline are continuous when combined (step S10). Stating that the first outline and the second outline are continuous does not necessarily require that the entire first outline and second outline be continuous. Rather, continuity in the outlines of the objects determined by the sameness determiner 28 to be outlines of the same object is sufficient. If the first outline and the second outline are not continuous (step S10: No), the combined area selector 29 makes corrections so that the first outline and the second outline are continuous by setting the area of and performing perspective conversion on either the first image or the second image (step S12).

When the first outline and the second outline are of the same object, the combined area selector 29 determines whether the first outline and the second outline are connected linearly at the border based on the first outline and the second outline received from the sameness determiner 28. If the first outline and second outline are a portion of the same object, these outlines are represented as straight lines by the aforementioned Hough transform or the like. Therefore, it can be determined whether the first outline and the second outline are connected linearly based on the position and angle of these lines.

At this time, xy coordinates such as those illustrated in FIG. 4 may be used, with the direction of travel of the automobile being one of the axes. For example, when the white line WLa is parallel to the y-axis and the white line WLc is inclined, the combined area selector 29 can determine that the two lines have a discontinuity at the border. At this time, since the white line WLc is inclined, the combined area selector 29 performs correction by perspective conversion on the captured image of the left-side area Ci so that the white line WLc becomes parallel to the y-axis. Also, when the width of the outline of the white line WLa and the width of the outline of the white line WLc differ, the combined area selector 29 can determine that the two lines have a discontinuity at the border. At this time, the combined area selector 29 sets the area of the captured image of the left-side area Ci (sets the ratio of expansion or reduction and sets the shift amount) so that the width of the outline of the white line WLc becomes the same as the width of the outline of the white line WLa. When the vehicle 15 is moving, the combined area selector 29 preferably performs correction at the moment when the vehicle 15 is moving in a straight line parallel to one of the axes of the xy coordinate system, based on control information acquired by the control information acquisition unit 22. At this time, it suffices for the outline of the same object to be corrected so as to be parallel to one of the axes in the xy coordinate system. Hence, the amount of calculation can be reduced.

After step S12, the combined area selector 29 again determines whether the first outline and the second outline are continuous when combined (step S10). When the outlines are continuous (step S10: Yes), the combined area selector 29 combines the first image and the second image (step S18).

In this way, after step S18, the image acquisition unit 21 outputs a pair of adjacent captured images that capture the area surrounding the vehicle 15 to the outline detector 27 and the like while changing the combination of captured images. Therefore, the outline detector 27, sameness determiner 28, and combined area selector 29 also execute the processing sequence for another pair of adjacent surrounding areas. At this time, if the combined area selector 29 has performed correction by perspective conversion or the like, the corrected captured image is preferably output from the image acquisition unit 21 to the outline detector 27 and the like in order to avoid duplicate processing.

In step S6, when the sameness determiner 28 determines that the first outline and the second outline are not of the same object (step S6: No), the combined area selector 29 terminates processing without performing correction.

In the above-described way, the image processing apparatus 12 according to this embodiment, which implements the aforementioned image processing method, determines whether there is a discontinuity at the borders of a plurality of images that capture the surrounding area of the vehicle 15 by extracting the outlines of the same object at or near the border between two adjacent captured images. When there is a discontinuity, correction is performed so that the objects are continuous at the border, allowing generation of a combined image that maintains continuity without causing the viewer any sense of discomfort. Automatic calibration that adjusts the area setting and perspective conversion setting of the captured images is thus possible.

Embodiment 2

The following describes Embodiment 2 with reference to the drawings.

Unlike the image processing apparatus 12 according to Embodiment 1, the image processing apparatus 12 according to this embodiment allows automatic calibration that adjusts the area setting and perspective conversion setting of the captured images even when the same object is not included simultaneously in adjacent captured images. The schematic structure of the image processing apparatus 12 and the camera system 10 provided with the image processing apparatus 12 is the same as in Embodiment 1, and therefore a description of components other than the sameness determiner 28 is omitted (see FIG. 1). In order to avoid redundant description, the following describes the differences from the image processing apparatus 12 according to Embodiment 1.

In this embodiment as well, based on the outline images of two adjacent captured images, the sameness determiner 28 determines whether objects appearing in the two captured images are the same object. The outline images of the two adjacent captured images received by the sameness determiner 28, however, are not images captured at the same time but rather are captured with a time difference therebetween. For example, when a delineator P on the road surface first appearing in the captured image at the front of the vehicle 15 appears in the captured image at the side of the vehicle after a predetermined length of time elapses, the sameness determiner 28 receives these captured images and determines whether the delineators P are the same. When the sameness determiner 28 determines that the objects are the same, the result of determination is communicated to the combined area selector 29. Based on information on the position and orientation of the same object in the two captured images, the combined area selector 29 performs area setting and perspective conversion setting of the captured images and can thus generate a combined image with no discontinuity.

Figure 6:
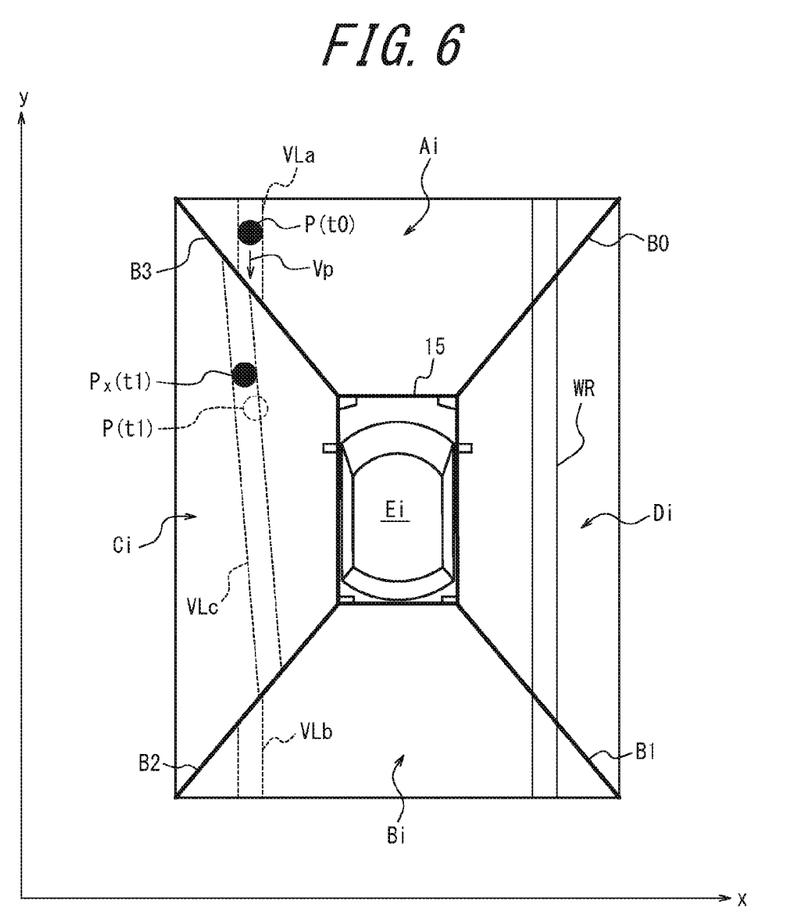
FIG. 6 illustrates an example of a combined image to be corrected.

FIG. 6 illustrates the trajectories VLa, VLc, and VLb of the delineator P on the road surface in the combined image being discontinuous at the borders B2 and B3 as a result of a shift in the image pickup range due to the attachment position of the left-side camera 11c being shifted by, for example, an external shock. Unlike the case of FIG. 4, the delineator P appears in the combined image, rather than the white line WL (which is an example of a continuous object). Here, the trajectories VLa, VLc, and VLb in FIG. 6 represent virtual trajectories of the delineator P as a result of the vehicle 15 moving. As illustrated in FIG. 6, in the captured image in the left-side camera 11c, the delineator P seems to be moving in a direction at an inclination from the direction of travel of the vehicle 15 (y-axis direction), which causes a sense of discomfort for the viewer. Accordingly, correction is necessary as in the example in FIG. 4.

Here, the delineator P is a post, installed along the road, to which a reflector is attached. As compared to a guardrail, for example, the delineator P is small and does not easily appear in two captured images at the same time. Therefore, there are cases in which the same method as in Embodiment 1 cannot be used. To address this issue, the image processing apparatus 12 according to this embodiment uses two captured images with a time difference to cause the same object (delineator P) to appear in two adjacent captured images, as in FIG. 6. In the example in FIG. 6, the captured image of the left-side area Ci at time t1 and the captured image of the front area Ai at the time t0 before the time t1 are used. The time difference between the captured images (t1−t0) is set so that due to the movement distance yielded by multiplying the time difference by the travel speed of the delineator P, the delineator P moves from inside the captured area of the front area Ai to inside the captured area of the left-side area Ci. The travel speed of the delineator P may, for example, be obtained from the speed of the vehicle 15 acquired by the control information acquisition unit 22.

In the example in FIG. 6, the captured image of the front area Ai (corresponding to the first image) includes the delineator P at time t0, and the captured image of the left-side area Ci (corresponding to the second image) includes the delineator P at time t1. These delineators P are the same object. The following describes the flow of processing by the image processing apparatus 12 with reference to FIG. 7. Each step is described in detail using the example in FIG. 6.

Figure 7:
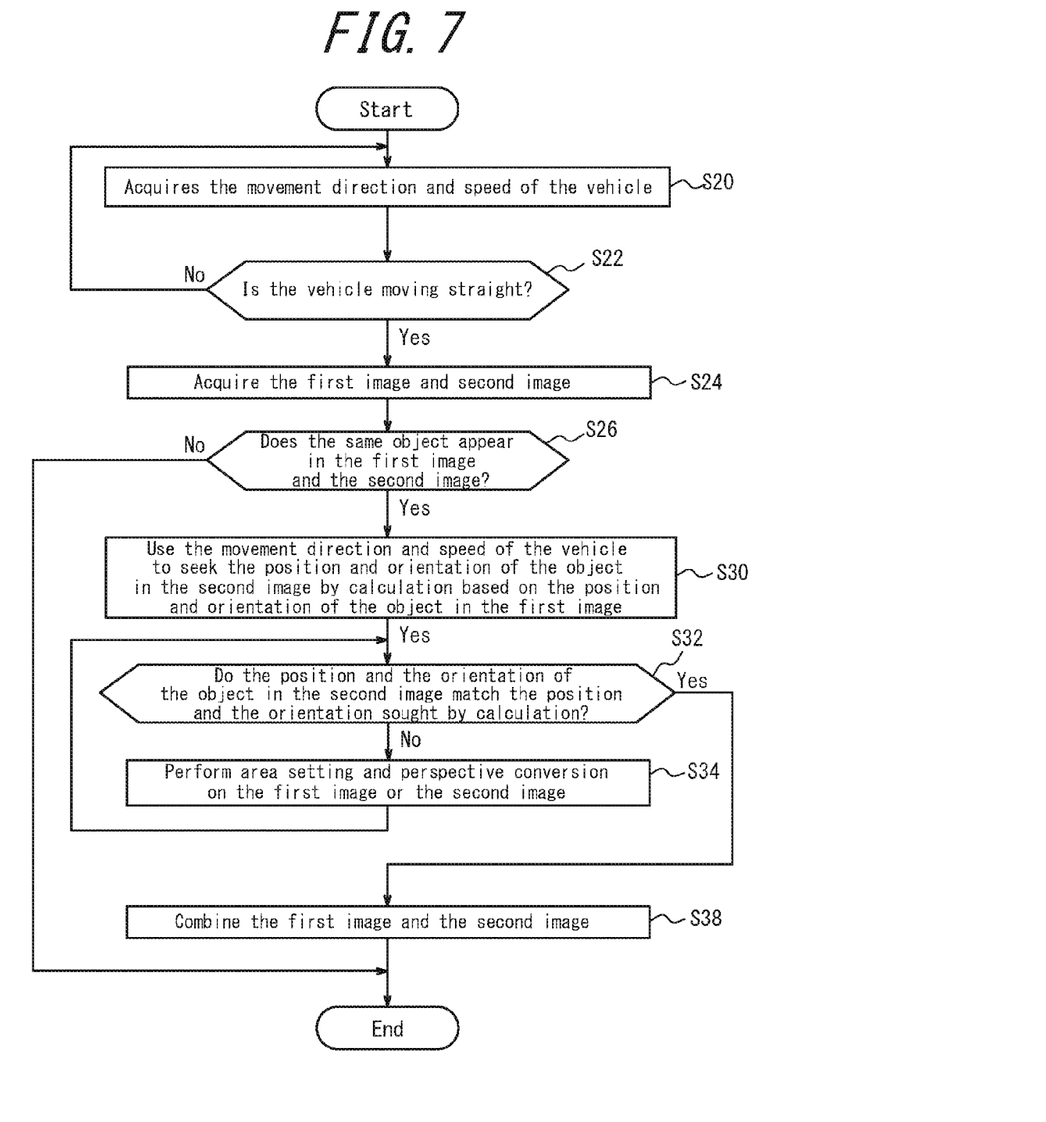
FIG. 7 is a flowchart illustrating operations by the image processing apparatus of Embodiment 2.

An outline of the processing is as follows. The image processing apparatus 12 waits for the vehicle 15 to travel straight before starting processing. Upon the vehicle 15 traveling straight, the image acquisition unit 21 acquires adjacent captured images with different captured times and outputs the result to the combined area selector 29. The combined area selector 29 determines whether the same object appears in the adjacent captured images, and if so, seeks the position and orientation of the object in the chronologically later captured image by calculation based on the chronologically earlier captured image and the speed and direction of the vehicle 15. The combined area selector 29 then sets the area of, and performs perspective conversion on, the chronologically later captured image and generates a combined image, so that the position and orientation of the object in the chronologically later captured image match the position and orientation sought by the aforementioned calculation. Details are provided below.

The processing by the image processing apparatus 12 in this embodiment requires that the same objects appear in two adjacent captured images as a result of the movement of the vehicle 15. Therefore, the vehicle 15 needs to be moving. Based on the control information acquired by the control information acquisition unit 22, the image processing apparatus 12 acquires the movement direction and the speed of the vehicle 15 (step S20). If the vehicle 15 is not moving straight (step S22: No), the image processing apparatus 12 returns to step S20, whereas when the vehicle 15 is moving straight, the image processing apparatus 12 executes the following processing (step S22: Yes). Here, the straight direction of the vehicle 15 is preferably parallel to one of the axes in the virtual xy coordinate system of the combined image. As described above, this is because the amount of calculation when performing correction can be reduced. Below, the vehicle 15 is described as moving straight in the direction of the y-axis.

The image acquisition unit 21 of the image processing apparatus 12 acquires a first image and a second image (step S24). Since step S24 corresponds to step S2 in Embodiment 1, details thereof are omitted.

The combined area selector 29 of the image processing apparatus 12 determines whether the same object appears in the first image and the second image (step S26). When the same object appears as in the example in FIG. 6 (step S26: Yes), the movement direction and speed of the vehicle 15 are used to seek the position and orientation of the object in the second image by calculation based on the position and orientation of the object in the first image (step S30).

When determining whether the same object appears, the combined area selector 29 may make the determination of sameness by extracting and comparing feature points. A known method may be used to extract feature points, such as a method to extract the luminance difference, corner detection, or the like. Based on the position and orientation of the delineator P in the image with the earlier captured time (the first image in this example, i.e. the captured image of the front area Ai), the combined area selector 29 can seek the position and orientation of the delineator P in the other image (the second image in this example, i.e. the captured image of the left-side area Ci) by calculation.

First, the combined area selector 29 recognizes that the vehicle 15 is traveling straight in the y-axis direction based on control information acquired by the control information acquisition unit 22 and calculates a unit vector Vp indicating the movement of the object per unit time in FIG. 6. Since the position of the delineator P at time t0 is P(t0), the position of the delineator P at time t1, i.e. P(t1), can be sought with the following equation.

$$P(t1)=Vp\times(t1-t0)+P(t0)$$

P(t1) corresponds to the aforementioned position of the delineator P sought by calculation. Since the vehicle 15 is traveling straight in the y-axis direction, the direction of the delineator P at time t1 is the opposite direction from the y-axis, and the opposite direction from the y-axis corresponds to the aforementioned orientation of the delineator P sought by calculation.

The combined area selector 29 of the image processing apparatus 12 determines whether the position and the orientation of the object in the second image match the position and the orientation sought by calculation (step S32). If the position and orientation of the object in the second image do not match the position and orientation sought by calculation (step S32: No), the combined area selector 29 performs area setting and perspective conversion on the first image or the second image, thereby performing correction so that these images match (step S34).

Step S32 is described using the example in FIG. 6. Since the position Px(t1) of the object in the captured image of the left-side area Ci does not match P(t1) sought by calculation, the combined area selector 29 performs correction so that these positions match. The combined area selector 29 performs correction by performing area setting and perspective conversion on the first image or the second image. In this example, the movement direction of the object in the captured image of the left-side area Ci is not parallel to the y-axis, and therefore the combined area selector 29 corrects the captured image of the left-side area Ci. In other words, the combined area selector 29 shifts the captured image of the left-side area Ci and performs perspective conversion so that the position Px(t1) of the object becomes the position P(t1) sought by calculation.

After step S34, the combined area selector 29 again determines whether the position and the orientation of the object in the second image match the position and the orientation sought by calculation (step S32). When the position and orientation match (step S32: Yes), the combined area selector 29 combines the first image and the second image (step S38).

Here, in step S26, when the same object does not appear in the first image and the second image (step S26: No), the combined area selector 29 terminates without performing correction. At this time, the first image and the second image may be acquired again while the time difference between the captured times of the first image and the second image is adjusted.

As described above, the image processing apparatus 12 according to this embodiment, which implements the aforementioned image processing method, not only achieves the same effects as Embodiment 1 but may also be applied when the same object does not appear simultaneously in adjacent captured images.

Although this disclosure is based on embodiments and drawings, it is to be noted that various changes and modifications will be apparent to those skilled in the art based on this disclosure. Therefore, such changes and modifications are to be understood as included within the scope of this disclosure. For example, the functions and the like included in the various components and steps may be reordered in any logically consistent way. Furthermore, components or steps may be combined into one or divided.

For example, in Embodiment 1, the case of the vehicle 15 being in motion was described, but even when the vehicle 15 is stopped, the same image processing apparatus 12 may operate using the same object located in surrounding areas and appearing in two adjacent captured images. For example, suppose that the vehicle 15 is an automobile to which the camera system 10 is attached, and that the vehicle 15 is conveyed by a belt conveyor. In this case as well, the same image processing apparatus 12 as in Embodiment 1 may operate using a white line or the like painted on the belt conveyor. In other words, automatic calibration that adjusts the area setting and perspective conversion setting of the captured images is possible.

In Embodiment 1, the image processing apparatus 12 executes a sequence of processing using objects that happen to exist outside the vehicle 15, but graphics drawn by laser light or the like irradiated from the vehicle 15 may be used as the aforementioned objects. In this case, the image processing apparatus 12 can perform automatic calibration that adjusts the area setting and perspective conversion setting of the captured images at any time.

Figure 8:
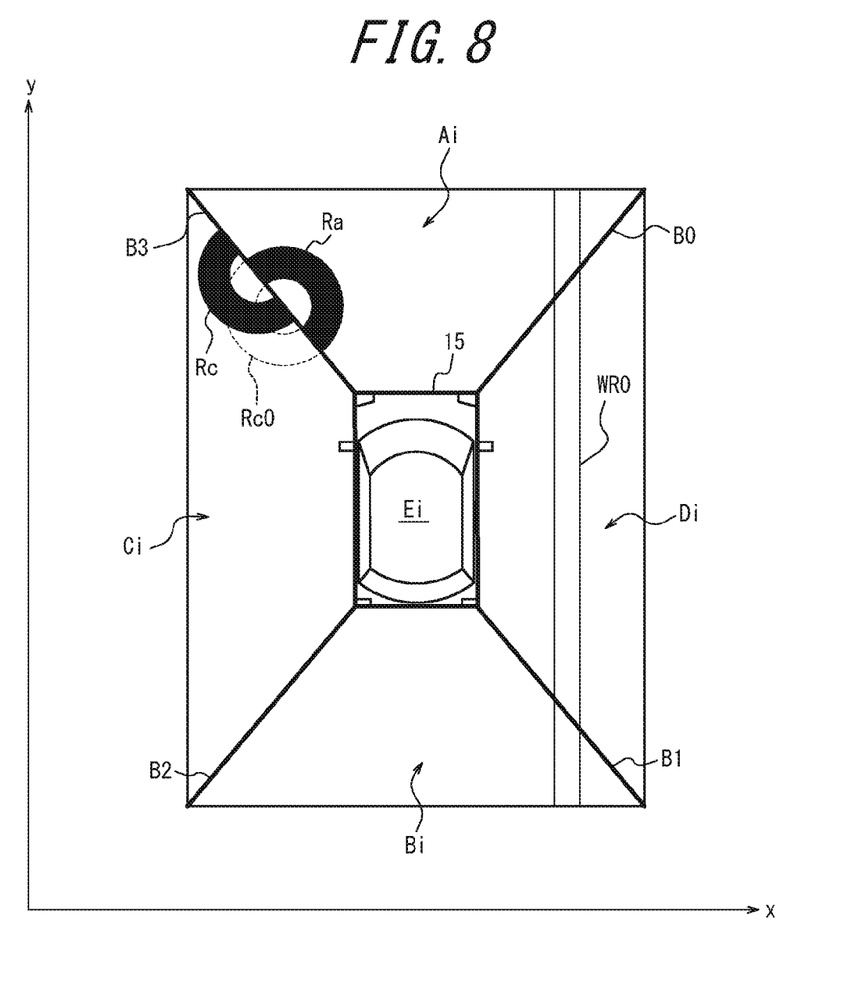
FIG. 8 illustrates an example of a combined image to be corrected.

For example, suppose that the vehicle 15 draws a ring-shaped graphic on the road with laser light, and that the graphic overlaps the border B3, as illustrated in FIG. 8. In this case, for example with the same processing as in Embodiment 1, the image processing apparatus 12 can adjust the area setting and perspective conversion setting of the captured images at any time. Unlike Embodiment 1, by the sameness determiner 28 knowing that a ring-shaped graphic is used for calibration (referred to below as prior knowledge) even though this graphic is not a long, linear object, more effective processing can be executed.

In the example in FIG. 8, the graphic Ra in the captured image of the front area Ai and the graphic Rc in the captured image of the left-side area Ci are discontinuous. The outline detector 27 performs outline detection on each of the captured image of the front area Ai (first image) and the captured image of the left-side area Ci (second image) to generate the first outline image that includes the outline of the graphic Ra and the second outline image that includes the outline of the graphic Rc, the graphics Ra and Rc being portions of a ring-shaped graphic. Based on the aforementioned prior knowledge, the sameness determiner 28 determines whether the first outline and the second outline are outlines of continuous objects (the ring-shaped graphic for calibration). The combined area selector 29 performs area setting and perspective conversion on the captured image of the left-side area Ci so that the graphic Rc is displayed at the position of the graphic Rc0 in FIG. 8 so as to be continuous at the border B3. In this way, automatic calibration can be performed as a result of a particular graphic being emitted from the vehicle 15. Such a graphic may, for example, be drawn by laser light emitted from the headlights of the vehicle 15.

A portion of the constituent elements of the camera system 10 according to the above-described embodiment may be provided external to the vehicle 15. For example, the image pickup apparatus, such as the front camera 11a; the image processing apparatus 12; and the like may be implemented as a communication device, such as a mobile phone or an external server, and be connected to the other constituent elements of the camera system 10 by a wired or wireless connection.

REFERENCE SIGNS LIST

10 Camera system
11a Front camera
11b Rear camera
11c Left-side camera
11d Right-side camera
12 Image processing apparatus
13 Display apparatus
14 Network
15 Vehicle
16 Door mirror
17a, 17b, 17c, 17d Optical system
18a, 18b, 18c, 18d Image pickup element
19a, 19b, 19c, 19d Image processor
20a, 20b, 20c, 20d Camera controller
21 Image acquisition unit
22 Control information acquisition unit
27 Outline detector
28 Sameness determiner
29 Combined area selector Ai Front area
Bi Rear area
Ci Left-side area
Di Right-side area
B0, B1, B2, B3 Border
P Delineator
WL White line
WR White line

The invention claimed is:

1. An image processing apparatus comprising:
one or more processors configured to implement:
an image acquisition unit configured to acquire a first image capturing a surrounding area of an automobile including a first area and a second image capturing a surrounding area of the automobile including a second area adjacent to the first area;
an outline detector configured to perform outline detection on the first image to generate a first outline of an object within the first image and perform outline detection on the second image to generate a second outline of an object within the second image, wherein at least one of the object within the first image and the object within the second image extends across a border between the first image and the second image;
a sameness determiner configured to determine, based on the first outline and the second outline, whether the object within the first image and the object within the second image is the same object; and
a combined area selector configured to determine, when the object within the first image and the object within the second image have been determined to be the same object, whether the first outline and the second outline are continuous or discontinuous across the border between the first image and the second image,
wherein, when the combined area selector determines that the first outline and the second outline are discontinuous across the border between the first image and the second image, the combined area selector performs area setting and perspective conversion on the first image or the second image to correct a discontinuity between the first outline and the second outline, and
wherein the combined area selector is further configured to combine at least the first image and the second image to generate a combined image, wherein, in the combined image, the first outline and the second outline are continuous across the border between the first image and the second image.

2. The image processing apparatus of claim 1, wherein the object within the first image or the object within the second image is any one selected from the group consisting of a display on a road surface, a guardrail, a side ditch, a road shoulder, and a delineator.

3. The image processing apparatus of claim 1, wherein the object within the first image or the object within the second image is a graphic drawn on a road surface by the automobile irradiating light.

4. An image processing apparatus comprising:
one or more processors configured to implement:
an image acquisition unit configured to acquire a first image capturing a surrounding area of an automobile including a first area and a second image capturing a surrounding area of the automobile including a second area adjacent to the first area;
an outline detector configured to perform outline detection on the first image to generate a first outline of an object within the first image and perform outline detection on the second image to generate a second outline of an object within the second image; and
a combined area selector configured to determine, based on the first outline and the second outline and movement of the automobile, whether the object within the first image and the object within the second image is the same object,
wherein, when the object within the first image and the object within the second image have been determined to be the same object, the combined area selector determines a position and an orientation of the object within the second image based on the first image and the movement of the automobile, performs area setting and perspective conversion on the second image, and combines at least the first image and the second image, in which area setting and perspective correction has been performed, to generate a combined image, and
wherein, in the combined image, the position and orientation of the object within the second image matches a position and an orientation of the object within the first image and corresponds to the movement of the automobile.

5. The image processing apparatus of claim 4, wherein the combined area selector uses a movement direction and a speed of the automobile.

6. The image processing apparatus of claim 5, wherein the combined area selector performs the area setting and the perspective conversion on the second image when the automobile is traveling straight.

7. The image processing apparatus of claim 4, wherein the object within the first image or the object within the second image is any one selected from the group consisting of a display on a road surface, a guardrail, a side ditch, a road shoulder, and a delineator.

8. An image processing method comprising:
acquiring a first image capturing a surrounding area of an automobile including a first area and a second image capturing a surrounding area of the automobile including a second area adjacent to the first area;
performing outline detection on the first image to generate a first outline of an object within the first image and performing outline detection to generate a second outline of an object within the second image, wherein at least one of the object within the first image and the object within the second image extends across a border between the first image and the second image;
sameness determining, based on the first outline and the second outline, whether the object within the first image and the object within the second image is the same object;
determining, when the object within the first image and the object within the second image have been determined to be the same object, whether the first outline and the second outline are continuous or discontinuous across the border between the first image and the second image;
when the first outline and the second outline are determined to be discontinuous across the border between the first image and the second image, performing area setting and perspective conversion on the first image or the second image to correct a discontinuity between the first outline and the second outline when the first outline and the second outline; and
generating a combined image by combining at least the first image and the second image, wherein, in the combined image, the first outline and the second outline are continuous across the border between the first image and the second image.

9. An image processing method comprising:

acquiring a first image capturing a surrounding area of an automobile including a first area and a second image capturing a surrounding area of the automobile including a second area adjacent to the first area;

performing outline detection on the first image to generate a first outline of an object within the first image and performing outline detection on the second image to generate a second outline of an object within the second image;

determining, based on the first outline and the second outline and movement of the automobile, whether the object within the first image and the object within the second image is the same object; and when the object within the first image and the object within the second image have been determined to be the same object, determining a position and an orientation of the object within the second image based on the first image and the movement of the automobile, performing area setting and perspective conversion on the second image, and combining at least the first image and the second image, in which area setting and perspective correction has been performed, to generate a combined image, wherein, in the combined image, the position and orientation of the object within the second image matches a position and an orientation of the object within the first image and corresponds to the movement of the automobile.

* * * * *